United States Patent Office 2,805,576
Patented Sept. 10, 1957

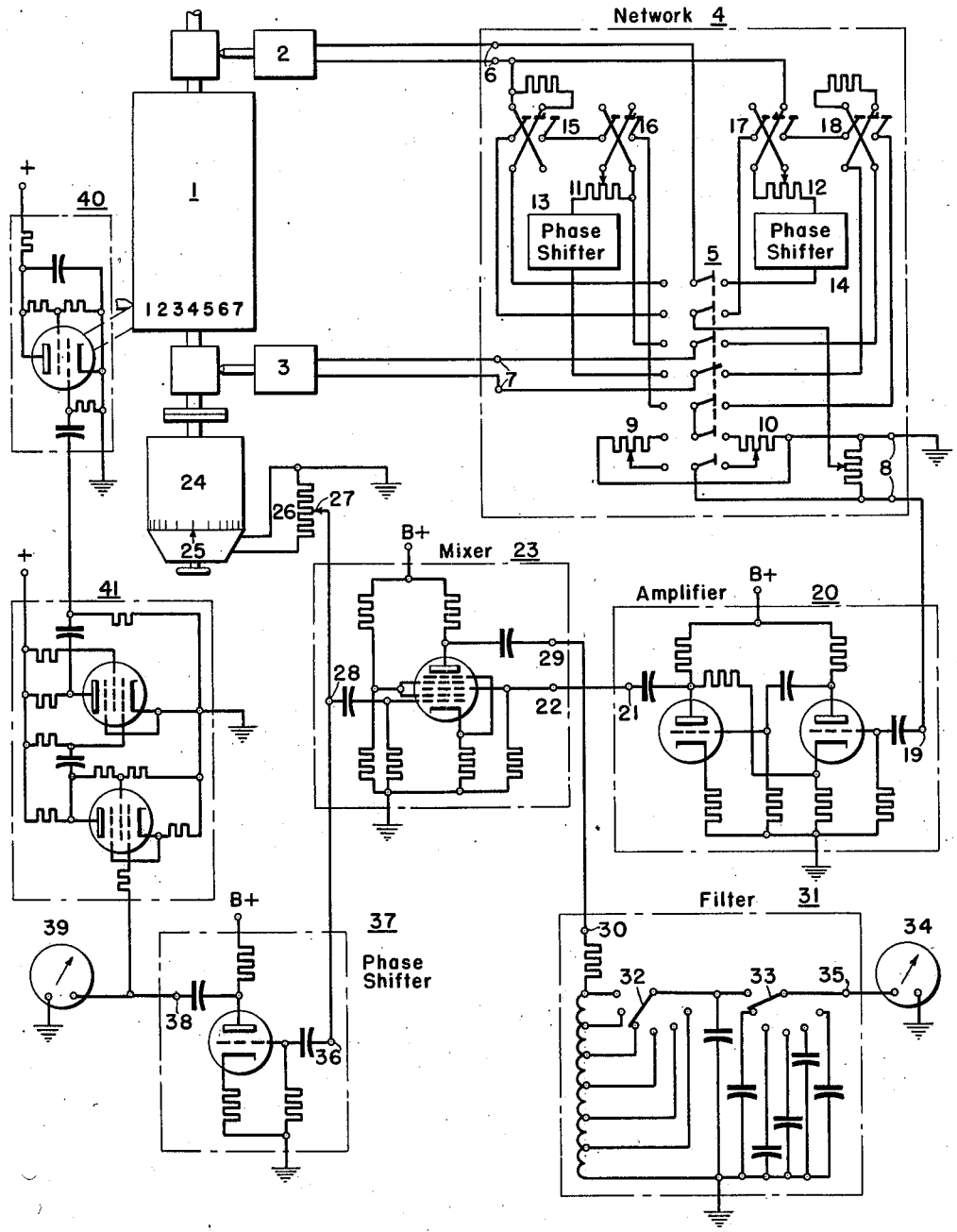

2,805,576

ELECTRICAL BALANCING MACHINE

Sheldon I. Rambo, Baltimore, Md., assignor to Westinghouse Electric Corporation, East Pittsburgh, Pa., a corporation of Pennsylvania Application May 15, 1953, Serial No. 355,345

12 Claims. (Cl. 73—466)

This invention relates to electrical balancing machines and more particularly to the elimination of "noise" difficulties in electrical balancing machines for indicating the position and magnitude of the unbalance of a rotor in two arbitrarily chosen planes of the rotor.

Patent 2,165,024, issued to John G. Baker and Frank C. Rushing on July 4, 1939, assigned to the same assignee, and entitled Indicating Balancing Machine, explains the need for accurately balancing rotors in large quantities for production purposes, and describes a method and discloses a most satisfactory means for accomplishing the result.

One difficulty with all balancing machines, however, has been that "noise" such as is caused by bearing roughness, stray pick-up at the low level pick-ups, etc. causes inaccuracy both in the indication of the actual angular position and the magnitude of the actual unbalance. This difficulty is particularly noticeable at low degrees of unbalance where the fundamental rotational signal is small and hence the signal-to-noise ratio is small.

Many attempts have been made at filtering out the "noise" signal in order to produce an amplified signal representing only the fundamental unbalance signal at rotational frequency. Ideal filtering has not been realized in any of the prior art systems, especially for the low signal-to-noise ratios.

The system contemplated is one which utilizes an essentially pure fundamental wave for measuring the magnitude and phase of unbalance of rotors.

One object of this invention is to electrically determine either separately or together the magnitude and phase of unbalance of a rotor.

A more specific object of this invention is to produce an amplified signal representing only the fundamental unbalance signal to measure the unbalance of a rotor.

A still more specific object of this invention is to generate a signal for measuring the unbalance of a rotor which represents only the fundamental unbalance signal.

Another specific object of this invention is to generate an essentially pure fundamental signal, match it against an unbalanced signal for magnitude and phase, and utilize the essentially pure fundamental signal for measuring the unbalance of a rotor.

The objects stated are merely illustrative. Still other objects and advantages will become apparent from a study of the following specification and the accompanying drawing, in which the single figure is a diagrammatic view of one embodiment of the invention.

The rotating piece 1 represents the piece to be balanced. It is supported on seismic bearings in the usual balancing machine fashion. A pair of pick-ups 2 and 3 represent pick-ups of the electromagnetic type, although they need not be restricted to this type, which convert the motion resulting from the unbalance of the rotating piece plus the "noise" due to bearing roughness etc. into a voltage at rotational frequency. Since the voltage generated in each pick-up will be due to the unbalance in both of the arbitrarily chosen correction planes, a network 4 is provided to balance a part of the voltage output from the pick-up 3 against the output voltage of the pick-up 2 in such a way as to give a voltage output from the network 4 which is proportional only to the unbalance in the arbitrarily chosen correction plane nearest the pick-up 2 when the reversing switch 5 is in its right-hand position. When the reversing switch 5 is in its left-hand position it will balance a portion of the voltage generated in pick-up 2 against the unbalance voltage generated in pick-up 3 to give a network output voltage which represents the unbalance in the arbitrarily chosen correction plane nearest the pick-up 3. Notice that the output of the network 4 in any case will contain the "noise" signal due to rough bearings and so forth.

The network 4 has input terminals 6 and 7 adapted to receive the voltages from the pick-ups 2 and 3, respectively, and output terminals 8. The network 4 contains potentiometers 9, 10, 11 and 12 for determining the magnitudes of the voltages from the pick-ups 2 and 3 which will be matched against each other for determining the unbalance in a given arbitrarily chosen correction plane. The phase shifters 13 and 14, the reversing switches 15, 16, 17, and 18 are for determining the phase of the voltages from the pick-ups 2 and 3 which are matched against each other so that the voltage appearing across the output terminals 8 of the network 4 will represent the unbalance voltage in the arbitrarily chosen correction plane both in phase and magnitude.

For a complete discussion of the network circuits and the method of calibrating the network, reference may be had to the John G. Baker and Frank C. Rushing patent above mentioned.

The voltage across the output terminals 8 of the network 4, which represents the phase and magnitude of the unbalance voltage in the arbitrarily chosen correction plane plus the "noise" signal, is applied to the input terminal 19 of the amplifier 20. The amplifier 20 may be of any one of a number of conventional types, one of which is shown. The output terminal 21 is connected to an input terminal 22 of a mixer circuit 23. Again, a preferred type of mixer is shown, but the particular type used is not critical.

A sine wave generator 24 having a phase adjusting vernier 25 is coupled directly to the rotating piece and develops a voltage at rotational frequency. This signal is applied across a potentiometer 26 which has a tap 27 for adjusting the magnitude of the output of the sine wave generator 24. The signal from the sine wave generator 24 is applied to another input terminal 28 of the mixer 23. The resultant signal of the mixer 23 appears at the output terminal 29 and is applied to an input terminal 30 of a filter circuit 31. The filter circuit 31 has adjustable taps 32 and 33 for tuning the circuit sharply to the rotational frequency to eliminate as much as possible the "noise" signal from the pick-ups 2 and 3. A meter 34 receives the output from the output terminal 35 of the filter circuit 31 and since the filter circuit 31 is sharply tuned to rotational frequency the meter 34 will indicate only that component of the resultant signal at the rotational frequency.

By adjusting the phase vernier 25 of the sine wave generator 24 and the tap 27 on potentiometer 26, the amplitude and phase of the voltage applied to the mixer 23 is adjusted and the meter 34 can be nulled. When the meter 34 is nulled, the output from the sine wave generator 24 across the portion of potentiometer 26, which is tapped off by the tap 27, will be an exact duplicate of the fundamental component of the orginal unbalance signal except displaced 180°. Therefore, the output tapped from the potentiometer 26 is applied to the input terminal 36 of 180° phase shifter 37 to give a voltage at its output terminal 38 for measurement purposes which is essentially purely sinusoidal with no superimposed "noise."

A meter 39 is provided for accurate measurement of the unbalance in the selected correction plane. The signal is also applied to fire a stroboscopic lamp circuit 40 for accurately indicating the angular position of the unbalance in the correction plane selected. In order to fire the stroboscopic lamp properly to "stop" the motion, a squaring-pulsing system 41 is provided to receive the output of the phase shifter 37 and supply the stroboscopic circuit 40. Another and somewhat simpler angle indication can be had by calibrating the phase control vernier 25 of the sine wave generator 24 directly in degrees to give a direct reading of the angle of unbalance in the selected correction plane.

Balancing may be accomplished without the use of the network 4. The unbalance voltage from the individual pick-ups 2 and 3 can be fed separately to the terminals 8 and the unbalance at the bearings can thus be determined. This unbalance magnitude and phase does not represent an unbalance signal due only to the unbalance in one plane but using the information thus obtained, the amount of correction necessary and the point of application can be calculated.

It will be recognized that the objects of the invention have been achieved by providing means for generating an essentially pure fundamental signal and matching it against an unbalance signal both in magnitude and phase and then utilizing the essentially pure fundamental signal for measuring the unbalance of a rotor in arbitrarily chosen correction planes.

While in accordance with the patent statutes one best known embodiment of the invention has been illustrated and described, it is to be particularly understood that the invention is not limited thereto or thereby, but that equivalents are clearly within the inventive scope.

I claim as my invention:

1. Apparatus for balancing rotors, in combination, bearing means rotatably supporting said rotor for vibratory movement in a single plane, means responsive to rotor vibration in said single plane for generating an unbalance signal having a known phase relation to vibration of the rotor for indicating the angular position of unbalance of the rotor, means responsive to rotor rotation for generating an essentially pure fundamental wave, means for adjusting the phase angle of said fundamental wave to have a given phase angle relationship to the phase of the unbalance signal, and indicating means responsive to said fundamental wave independently of said unbalance signal for indicating the angle of unbalance of the rotor.

2. Apparatus for balancing rotors, in combination, bearing means rotatably supporting said rotor for vibratory movement in a single plane, means responsive to rotor vibration in said single plane for generating an unbalance signal indicative of the angular position of unbalance of said rotor, means responsive to rotor rotation for generating an essentially pure fundamental wave, means for comparing said fundamental wave and said unbalance signal, means for adjusting the phase angle of said fundamental wave to bear a fixed relationship to the phase angle of the unbalance signal, and indicating means responsive to said fundamental wave independently of said unbalance signal for indicating the angle of unbalance of the rotor.

3. Apparatus for balancing rotors, in combination, bearing means rotatably supporting said rotor for vibratory movement in a single plane, means responsive to rotor vibration in said single plane for generating an unbalance signal indicative of the magnitude and angle of unbalance of the rotor, means responsive to rotation of the rotor for generating an essentially pure fundamental wave, means for adjusting the magnitude and phase of said fundamental wave to have a given relationship to the magnitude and phase of the unbalance signal, and indicating means responsive to said fundamental wave independently of said unbalance signal for indicating the magnitude and angle of unbalance of the rotor.

4. Apparatus for balancing rotors, in combination, bearing means rotatably supporting said rotor for vibratory movement in a single plane, means responsive to rotor vibration in said single plane for generating an unbalance signal indicative of the magnitude and angle of unbalance of said rotor, means responsive to rotation of the rotor for generating an essentially pure fundamental wave, means for comparing said fundamental wave and said unbalance signal, means for adjusting the magnitude and phase angle of said fundamental wave to bear a fixed relationship to the magnitude and phase angle of the unbalance signal, and indicating means responsive to said fundamental wave independently of said unbalance signal for indicating the magnitude and angle of unbalance of the rotor.

5. Apparatus for balancing rotors, in combination, bearing means rotatably supporting said rotor for vibratory movement in a single plane, means responsive to rotor vibration in said single plane for generating an unbalance signal indicative of the magnitude and angle of unbalance of the rotor, means responsive to rotor rotation for generating an essentially pure fundamental wave, a mixer for receiving said unbalance signal and said fundamental wave, measuring means for measuring the output of said mixer, circuit means for adjusting the magnitude and phase angle of said fundamental wave for the purpose of nulling said measuring means, and indicating means responsive to said fundamental wave independently of said unbalance signal for indicating the magnitude and angle of unbalance of the rotor.

6. Apparatus for balancing rotors, in combination, bearing means rotatably supporting said rotor for vibratory movement in a single plane, means responsive to rotor vibration for generating an unbalance signal having a magnitude and phase angle indicative of the magnitude and angle of unbalance of said rotor, means responsive to rotor rotation for generating an essentially pure fundamental wave, a mixer for receiving said unbalance signal and said fundamental wave, measuring means for measuring the output of said mixer, circuit means for adjusting the magnitude and phase angle of said fundamental wave for the purpose of nulling said measuring means, and indicating means responsive to said fundamental wave independently of said unbalance signal for indicating the angular position of unbalance of the rotor.

7. Apparatus for balancing rotors, in combination, bearing means rotatably supporting said rotor for vibratory movement in a single plane, means responsive to rotor vibration for generating an unbalance signal of magnitude and phase angle indicative of the magnitude and angle of unbalance of said rotor, means responsive to rotor rotation for generating an essentially pure fundamental wave, a mixer for receiving said unbalance signal and said fundamental wave, measuring means for measuring the output of said mixer, means for adjusting the magnitude and phase of said fundamental wave for the purpose of nulling said measuring means, a phase shifter connected to receive the fundamental wave and shift its phase, a meter connected to indicate the magnitude of the fundamental wave and thus the magnitude of rotor unbalance, and indicating means responsive to the fundamental wave independently of said unbalance signal for indicating the angle of unbalance of said rotor.

8. In a balancing machine for rotors, the combination of means adapted to rotate a rotor freely in space whereby said rotor will rotate about its inertia axis and any two points on the geometric axis will oscillate harmonically in two lines perpendicular to the inertia axis and including said points, means for generating alternating current voltages proportional to the oscillations of said points in the geometric axis, and means adapted to change the phase and magnitude of one of said voltages associated with one of said points to produce a resultant voltage that is proportional to the unbalance of the rotor, means responsive to rotor rotation for generating an essentially pure fundamental voltage, means for adjusting the phase and magnitude of said fundamental voltage to be equal and opposite to said resultant voltage, and indicating means responsive to said fundamental voltage independently of said resultant voltage for indicating the magnitude and angle of unbalance of the rotor with respect to said one point.

9. In a balancing machine for rotors, the combination of means adapted to rotate a rotor freely in space whereby said rotor will rotate about its inertia axis and any two points on the geometric axis will oscillate harmonically in two lines perpendicular to the inertia axis and including said points, means for generating alternating current voltages proportional to the oscillations of said points in the geometric axis, and means adapted to change the phase and magnitude of one of said voltages associated with one of said points to produce a resultant voltage that is proportional to the unbalance of the rotor, means responsive to rotor rotation for generating an essentially pure fundamental voltage, means for adjusting the magnitude and phase of said fundamental voltage to have a given relationship to the magnitude and phase of said resultant voltage, and indicating means responsive to said fundamental voltage independently of said resultant voltage for indicating the magnitude and angle of unbalance of the rotor.

10. In a balancing machine for rotors, the combination of means adapted to rotate a rotor freely in space whereby said rotor will rotate about its inertia axis and any two points on the geometric axis will oscillate harmonically in two lines perpendicular to the inertia axis and including said points, means for generating alternating current voltages proportional to the oscillations of said points in the geometric axis, and means adapted to change the phase and magnitude of one of said voltages to produce a resultant voltage associated with one of said points that is proportional to the unbalance of the rotor, means responsive to rotor rotation for generating an essentially pure fundamental voltage, means for adjusting the magnitude and phase of said fundamental voltage to have a given relationship to the magnitude and phase of said resultant voltage, and indicating means responsive to said fundamental voltage independently of said resultant voltage for indicating the angle of unbalance of the rotor.

11. In a balancing machine for rotors, the combination of means adapted to rotate a rotor freely in space whereby said rotor will rotate about its inertia axis and any two points on the geometric axis will oscillate harmonically in two lines perpendicular to the inertia axis and including said points, means for generating alternating current voltages proportional to the oscillations of said points in the geometric axis, and means adapted to change the phase and magnitude of one of said voltages associated with one of said points to produce a resultant voltage that is proportional to the unbalance of the rotor in a transverse plane including said one point, means responsive to rotor rotation for generating an essentially pure fundamental voltage, means for comparing said fundamental voltage and said resultant voltage, phase shift means for adjusting the phase of said fundamental voltage to bear a fixed relationship to the phase of said resultant voltage, and indicating means responsive to said fundamental voltage independently of said resultant voltage for indicating the angle of unbalance of the rotor.

12. In a balancing machine for rotors, the combination of means adapted to rotate a rotor freely in space whereby said rotor will rotate about its inertia axis and any two points on the geometric axis will oscillate harmonically in two lines perpendicular to the inertia axis and including said points, means for generating alternating current voltages proportional to the oscillations of said points in the geometric axis, and means adapted to change the phase and magnitude of one of said voltages associated with one of said points to produce a resultant voltage that is proportional to the unbalance of the rotor in a transverse plane including said one point, means responsive to rotor rotation for generating an essentially pure fundamental voltage, means for adjusting the magnitude and phase angle of said fundamental voltage to have a given relationship to the magnitude and phase of said resultant voltage, a mixer for receiving said resultant voltage and said fundamental voltage, measuring means for measuring the output of said mixer, means for adjusting the magnitude and phase of said fundamental voltage for the purpose of nulling said measuring means, and indicating means responsive to said fundamental voltage independently of said resultant voltage for indicating the magnitude and angle of unbalance of the rotor.

References Cited in the file of this patent

UNITED STATES PATENTS

| | | |
|---|---|---|
| 2,118,770 | Sivertsen | May 24, 1938 |
| 2,131,602 | Thearle | Sept. 27, 1938 |
| 2,165,024 | Baker et al. | July 4, 1939 |
| 2,243,379 | Johnson | May 27, 1941 |
| 2,243,458 | Esval | May 27, 1941 |